United States Patent Office  3,400,844
Patented Sept. 10, 1968

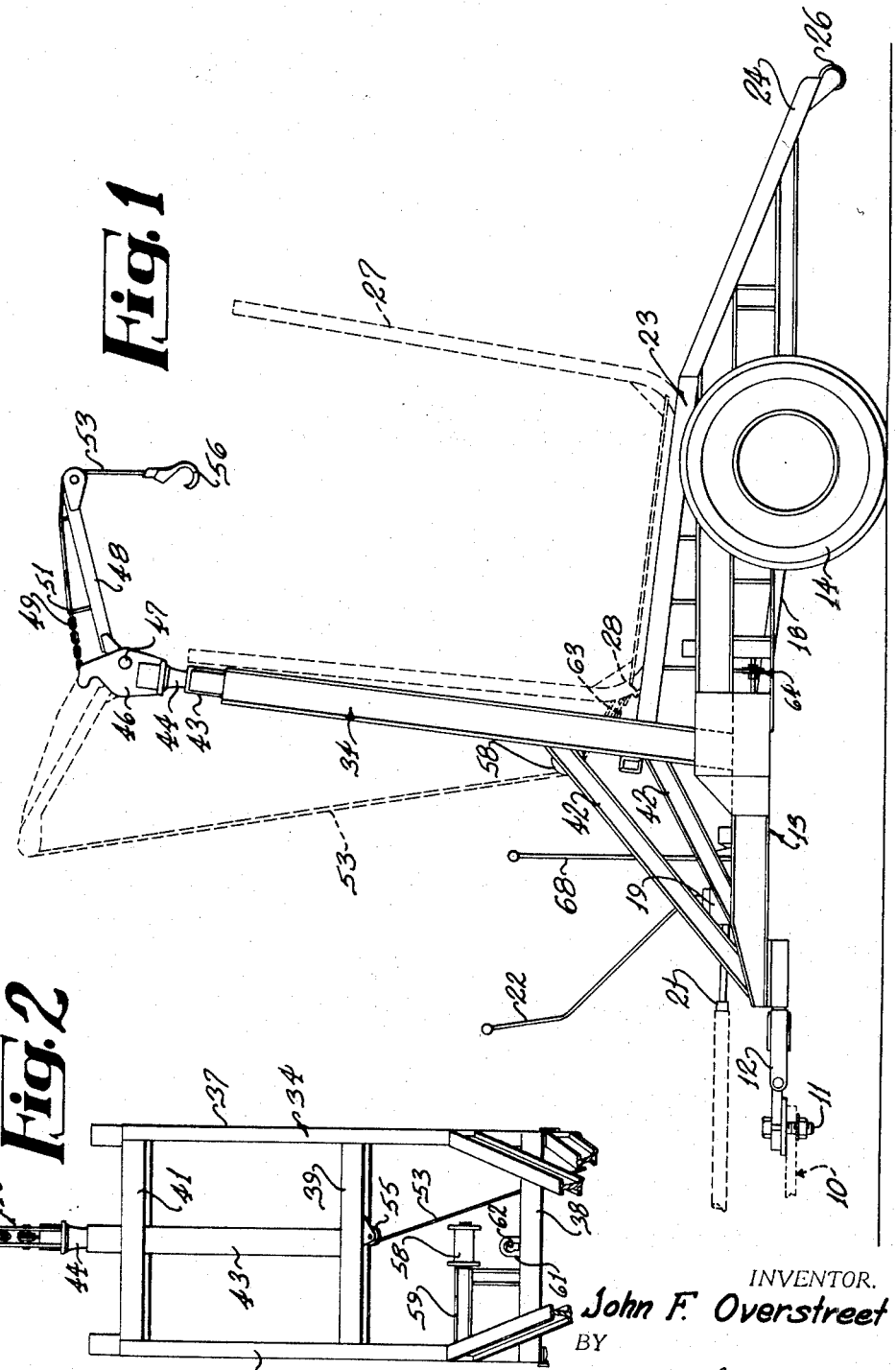

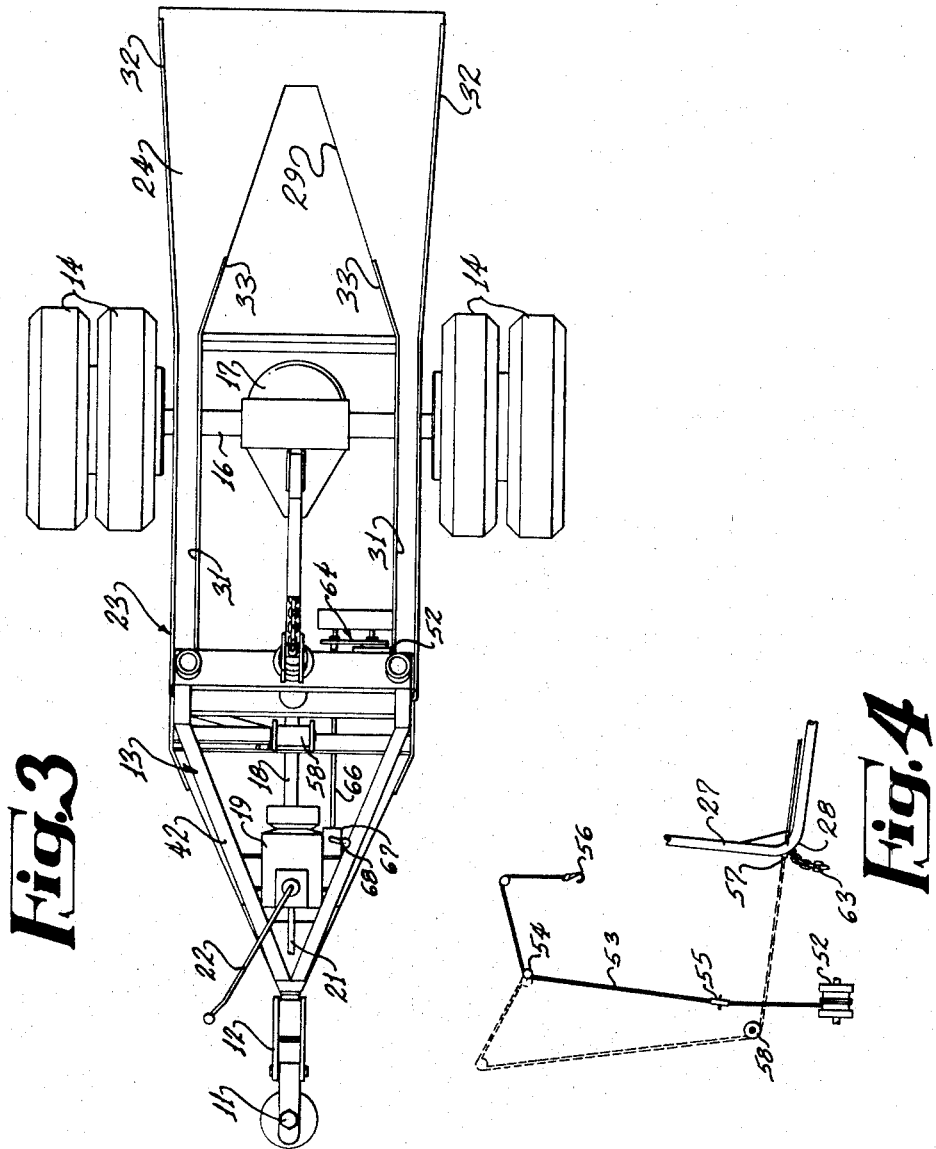

3,400,844
APPARATUS FOR LOADING AND TRANS-
PORTING PALLET-LIKE UNITS
John F. Overstreet, Thomasville, Ala. 36784
Filed Feb. 6, 1967, Ser. No. 614,142
5 Claims. (Cl. 214—517)

ABSTRACT OF THE DISCLOSURE

A wheel supported frame having its wheels operatively connected to and its forward end pivotally connected to a translatable power unit. A downwardly and rearwardly inclined support frame is carried by the wheel supported frame with the rear end thereof terminating rearwardly of and below the wheel supported frame. A column, boom and winch unit is mounted adjacent the forward end of the support frame to pull pallet-like members up the inclined support frame and means detachably connects the pallet-like member to the support frame.

Background of the invention

Heretofore in the art to which my invention relates, it has been very difficult to pull vehicles loaded with pulpwood pallets over soft, marsh, wooded areas, due to the fact that such vehicles bog down and are difficult to move. It often occurs that while the tractor pulling unit is in an area where traction cannot be made between the tractor unit and the ground, the pallet supporting vehicle towed by the tractor unit is in an area where good traction is provided between the supporting wheels of the vehicle and the ground. This is especially true where the tractor unit is moving up an incline while the pallet supporting vehicle is supported on level ground or where the tractor unit is supported by soft, soggy, or slick ground while the pallet supporting vehicle is supported on dry, firm ground. Accordingly, with apparatus heretofore employed, the movement of the apparatus depended entirely upon the condition and inclination of the soil beneath the tractor unit which pulled the pallet supporting vehicle. Furthermore, it has been difficult to move pallets onto a supporting vehicle while in a wooded area due to the fact that no effective means has heretofore been provided for moving the pallets in a continuous motion from the ground up onto the pallet supporting vehicle.

Brief summary of invention

I provide improved apparatus for loading pallet-like units onto a vehicle and improved means for moving the loaded vehicle over terrain which has heretofore been impassable by conventional pallet supporting vehicles. This is accomplished by mounting a transmission unit on a pallet supporting vehicle and operatively connecting the transmission unit to the wheels of the vehicle. A power-takeoff operatively connects the transmission unit to a power unit, such as a crawler-type tractor, whereby the wheels of the pallet supporting vehicle are propelled to aid in movement thereof. A downwardly and rearwardly inclined support frame is mounted rigidly on the pallet supporting vehicle and terminates rearwardly of and below the vehicle in position to receive a pallet as the pallet is moved forward relative to the support frame. An upstanding column is mounted on the pallet supporting vehicle and carries a boom which is pivotally connected thereto. A winch is also mounted on the vehicle and is provided with a cable which extends upwardly of the column and boom and then passes around a sheave adjacent the forward end of the vehicle in position to be detachably connected to a pallet.

Apparatus embodying features of my invention is illustrated in the accompanying drawings, forming a part of this application, in which:

FIG. 1 is a side elevational view, showing a fragment of a translatable power unit in dotted lines;

FIG. 2 is a fragmental, front elevational view showing the upper portion of an upstanding frame which carries the column and boom structure;

FIG. 3 is a top plan view of the apparatus; and,

FIG. 4 is a diagrammatic view showing the manner in which the winch unit is associated with the column, boom and pallet-like unit.

Referring now to the drawings for a better understanding of my invention, I show a fragment of a translatable power unit 10 which may be in the form of a crawler-like tractor or the like. Pivotally connected to the power unit 10 by a suitable pivot pin 11 is a tow bar 12 of a main frame 13 having supporting wheels 14. As shown in FIG. 3, the wheels 14 are carried by a transverse axle assembly 16 having a differential unit 17 which is operatively connected by a drive shaft 18 to a transmission unit 19 mounted adjacent the forward end of frame 13.

One end of a power take-off member 21 is operatively connected to the transmission unit 19 for propelling the same. The other end of the power take-off member 21 is operatively connected to and driven by the motor of the translatable power unit 10 in a manner well understood in the art. The transmission unit 19 is provided with the usual shift lever 22 whereby the wheels 14 may be propelled at different speeds.

Mounted rigidly on the main frame 13 is a downwardly and rearwardly inclined pallet support frame 23 having a rear end portion 24 which terminates rearwardly of and below the main frame 13, as shown in FIG. 1. The rearmost portion of the inclined support frame 23 is provided with a transversely extending, rounded member 26 which aids in movement of the forward end of a pallet-like unit up onto the inclined portion 24 of the inclined frame 23. The pallet-like unit is indicated in dotted lines at 27 in FIG. 1 and a fragment thereof is shown in FIG. 4. The forward end of the pallet-like unit 27 is curved as at 28 whereby it is adapted to move upwardly over the rounded end member 26 and then up the inclined portion 24 onto the forward portion of the supporting frame 23. To reduce the overall weight of the apparatus, an opening 29 is provided in the rearwardly extending portion 24, as shown in FIG. 3.

Longitudinally extending grooves 31 are provided at opposite sides of the inclined, support frame 23, as shown in FIG. 3 for receiving laterally spaced bases or horizontal portions of the pallet-like member 27. The grooves 31 may be provided by employing channel-like members or I-beams at opposite sides of the frame 23. Upstanding flanges 32 are provided along opposite sides of the rearwardly extending portion 24, as shown in FIG. 3 to aid in guiding the pallet-like unit 27 as it is pulled upwardly onto the inclined support frame 23. Upstanding flange members 33 are also provided alongside the opening 29 to aid in directing the bases of the pallet-like unit 27 into the grooves 31.

The pallet-like unit 27 is generally U-shaped, as viewed in side elevation, as shown in FIG. 1, and is adapted to receive pulpwood, logs and the like therebetweeen in a manner well understood in the art. In view of the fact that such pallet units are of a conventional type, no further description thereof is deemed necessary.

Mounted on and extending upwardly from the main frame 13 adjacent the forward end of the inclined, support frame 23 is an upstanding frame 34 which comprises vertical side members 36 and 37 which are connected to each other by transverse frame members 38, 39 and 41, as shown in FIG. 2. Suitable brace members 42 are interposed between the forward portion of the main frame 13 and the upstanding frame 34, as shown in FIG. 1. Secured to the transverse frame members 39 and 41 is an upstanding, hollow column 43. Mounted for rotation in the upper end of the column 43 is a hollow support member 44 which carries an upstanding bracket 46, as shown in FIG. 1. Pivotally connected to the bracket 46 by a pivot pin 47 is a hollow boom-like member 48 which is held at selected angular positions relative to the vertical frame 34 by a chain 49 connected at one end to the boom-like member 48 as at 51. The other end of the chain 49 is detachably connected to the bracket 46 whereby the effective lengths of the chain 49 may be varied to thus move the free end of the boom-like member 48 to selected elevations.

Mounted on the frame 13 beneath the column 43 is a winch unit indicated generally at 52 having a flexible cable 53 which extends upwardly through the hollow column 43 and support member 44. A sheave 54 is carried by the bracket 46 for receiving the cable 53, as shown in FIG. 4. Also, a sheave 55 is mounted adjacent the lower end of the column 43 for receiving cable 53. The boom-like member 48 is hollow or is provided with a longitudinally extending opening therethrough for receiving the cable 53 after it leaves the sheave 54. A hook 56 is carried by the free end of cable 53 for engaging an eye in a forwardly projecting bracket 57 carried by the pallet unit 27, as shown in FIG. 4. A pulley 58 is mounted for rotation on a suitable support bracket 59 carried by the upstanding frame 34 in position to receive the cable 53, as shown in dotted lines in FIG. 1, whereby a substantially straight-line pull is applied to the bracket 57 carried by the pallet unit 27. It will be understood that the boom-like member 48 may be rotated 360° whereby the cable 53 may move directly from the solid line position shown in FIG. 1 around the pulley 58 and then rearwardly of the frame 23 or the boom-like member 48 may be moved to the dotted line position prior to passing the cable around the pulley 58.

Mounted on the transverse member 38 carried by the upstanding frame 34 is an upstanding bracket 61 having a slotted opening 62 therein for receiving the end of a short chain 63 whereby the pallet unit 27 is detachably connected to the apparatus adjacent the forward end of frame 23. The slotted opening 62 is provided with an enlarged diameter portion adjacent the top thereof whereby the chain 63 may be inserted therein and then move downwardly into the narrow portion of the slot 62 to thus secure the chain to the bracket 61.

The winch 52 is connected by a sprocket and chain drive 64 to a power take-off shaft 66 which is connected in driving relation with the transmission unit 19 by a gear box 67, as shown in FIG. 3. A suitable operating lever 68 is carried by the gear box 67 for reversing the direction of rotation of the power take-off shaft 66 whereby the winch 52 may be driven in opposite directions or remain in an idle position in a manner well understood in the art. Since the winch unit is a conventional type unit which is provided with brake means for holding the winch and its cable at selected positions, no further description of this apparatus is deemed necessary.

From the foregoing description, the operation of my improved apparatus will be readily understood. Pulpwood, logs or the like are positioned within the pallet 27 in the usual manner. The cable 53 is passed around and under the pulley 58 and the hook 56 is connected to the eye of the bracket 57. The operating lever 68 is then moved into position to drive the winch 52 in a direction to pull the pallet unit 27 up over the transverse member 26 and then up the rearwardly sloping portion 24 of frame 23 until the pallet 27 moves to the dotted line position shown in FIG. 1. The free end of the short chain member 28 is then inserted through the slotted opening 62 in bracket 61 whereupon it drops to the narrow, lower portion of the slot 62 to thus detachably connect the chain 63 and the pallet unit 27 to the bracket 61.

With the pallet unit 27 thus loaded on the inclined, fixed frame 23, the operating lever 22 is moved into position to cause the transmission unit 19 to impart rotary motion to the wheels 14 as the frame 13 is pulled forwardly by the translatable power unit 10, such as a crawler type tractor. Since the frame 13 is pivotally connected to the power unit 10 by pivot pin 11, the apparatus is adapted to turn in a minimum of space. Also, by providing a relatively narrow frame 13, the apparatus is adapted to move through relatively close clearances whereby it is not necessary to clear roads to the area where the pallets 27 are to be loaded onto the frame 23. In the event the tractor unit 10 passes over an area where good traction is not obtained, the power driven wheels 14 of the frame 13 aid in pushing the power unit 10 as well as the frame 13 across such areas. Also, the power driven wheels 14 aid in moving the frame 13 up inclines, thus reducing the load placed on the tractor unit 10.

From the foregoing, it will be seen that I have devised improved apparatus for loading and transporting pallet-like units. By providing a versatile unit which is adapted to load the pallet units 27 without having to make adjustments to the supporting frame, the pallets may be loaded in a continuous manner in a minimum of time and with a minimum of labor. By detachably connecting the forward end of the pallet units 27 to the apparatus, the pallets are held in place until the pallet reaches the unloading position whereupon the chain 63 is released and the pallet 27 is then free to move down the elongated grooves 31 and the rearwardly sloping portion 24 whereby the pallet is removed easily from the frame 23. By providing a transmission unit on the main frame 13 together with means for operatively connecting the transmission unit to the supporting wheels 14, the pallet supporting vehicle is adapted to move over terrain which heretofore was impassable for pallet supporting vehicles drawn by tractor units.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

I claim:

1. In apparatus for loading and transporting pallet-like units on a wheel supported frame pivotally connected at its forward end to a translatable power unit, the improvement which comprises:
 (a) a transmission unit mounted on said wheel supported frame and operatively connected to the wheels thereof for driving the same,
 (b) a power take-off operatively connecting said translatable power unit in driving relation with said transmission,
 (c) a downwardly and rearwardly inclined support frame mounted rigidly on said wheel supported frame with the rear end of said support frame terminating rearwardly of and below said wheel supported frame in position to receive a pallet-like member upon forward movement of said pallet-like member relative to said support frame,
 (d) an upstanding column mounted on said wheel supported frame,
 (e) a boom-like member pivotally connected to the upper end of said column,
 (f) means holding said boom-like member at selected angular positions relative to said column to vary the elevation of the outer end of said boom-like member,
 (g) a winch mounted on said wheel supported frame and having a flexible cable-like member which extends upwardly of said column and said boom-like member,
 (h) a sheave mounted adjacent the forward end of said support frame in position to receive said cable-like member after it leaves said boom-like member, and
(i) means detachably connecting the end of said cable-like member to said pallet-like unit.

2. In apparatus for loading and transporting pallet-like units as defined in claim 1 in which the boom-like member is adapted for rotation relative to said column.

3. In apparatus for loading and transporting pallet-like units as defined in claim 1 in which said column and said boom-like member are provided with openings therethrough for receiving the cable-like member.

4. In apparatus for loading and transporting pallet-like units as defined in claim 1 in which releasable connector means is provided adjacent the forward end of said support frame for detachably connecting the adjacent end of a pallet-like member to said support frame.

5. In apparatus for loading and transporting pallet-like units as defined in claim 1 in which the winch is operatively connected to said transmission unit by a power take-off unit so that said winch is driven by said transmission unit.

References Cited

UNITED STATES PATENTS 2,804,216  8/1957  Farnam.
3,066,810  12/1962  Sartin _____ 214—85.1 X ALBERT J. MAKAY, *Primary Examiner.*